United States Patent [19]

Copley et al.

[11] Patent Number: 5,519,988

[45] Date of Patent: May 28, 1996

[54] NARROW ROW COTTON PICKER AND A ROW UNIT THEREFOR

[75] Inventors: Russell D. Copley; Joel M. Schreiner, both of Ankeny, Iowa

[73] Assignee: Deere & Company, Moline, Ill.

[21] Appl. No.: 389,522

[22] Filed: Feb. 16, 1995

[51] Int. Cl.⁶ .................................................. A01D 46/10
[52] U.S. Cl. ........................................ 56/30; 56/40
[58] Field of Search ................................ 56/40, 41, 42, 56/43, 44, 45, 50, 30

[56] References Cited

U.S. PATENT DOCUMENTS

| | | | |
|---|---|---|---|
| Re. 32,699 | 6/1988 | Fachini | 56/44 |
| 4,348,856 | 9/1982 | Copley et al. | 56/30 |
| 4,483,131 | 11/1984 | Schlueter | 56/15.6 |
| 4,498,277 | 2/1985 | Bennett et al. | 56/1 |
| 4,803,830 | 2/1989 | Junge et al. | 56/28 |
| 4,821,497 | 4/1989 | Deutsch et al. | 56/40 X |
| 4,875,330 | 10/1989 | Deutsch | 56/41 |
| 4,896,492 | 1/1990 | Junge et al. | 56/28 |
| 4,928,459 | 5/1990 | Thedford et al. | 56/13.3 |
| 5,247,786 | 9/1993 | Schreiner | 56/43 X |

*Primary Examiner*—Terry Lee Melius

[57] ABSTRACT

A cotton harvester row unit having an in-line drum arrangement and a door chamber cross section which remains generally constant from the rear structural post so that the suction door can be moved closer to the row centerline to narrow the overall width of the unit. The unit is sufficiently narrow that cotton in row spacings of less than 30 inches can be harvested. The new suction door location allows the cotton from the rear doffer to enter the door more directly. The row unit picker drums include picker bars with 14 or 16 spindles per bar to shorten the height and weight of the unit and permit use of shorter stalk lifters so that unit length is also reduced. A two-row tractor mounted picker utilizes the narrow row units mounted on a rail type of support system at the rear of a tractor. The units are laterally adjustable on rails for accommodating different row spacings and patterns, including 60 centimeter row spacings and 60–30 centimeter skip row spacings. The tractor rockshaft control valve, connected through a height control valve to lift cylinders, provides unit lift and automatic height control.

18 Claims, 8 Drawing Sheets

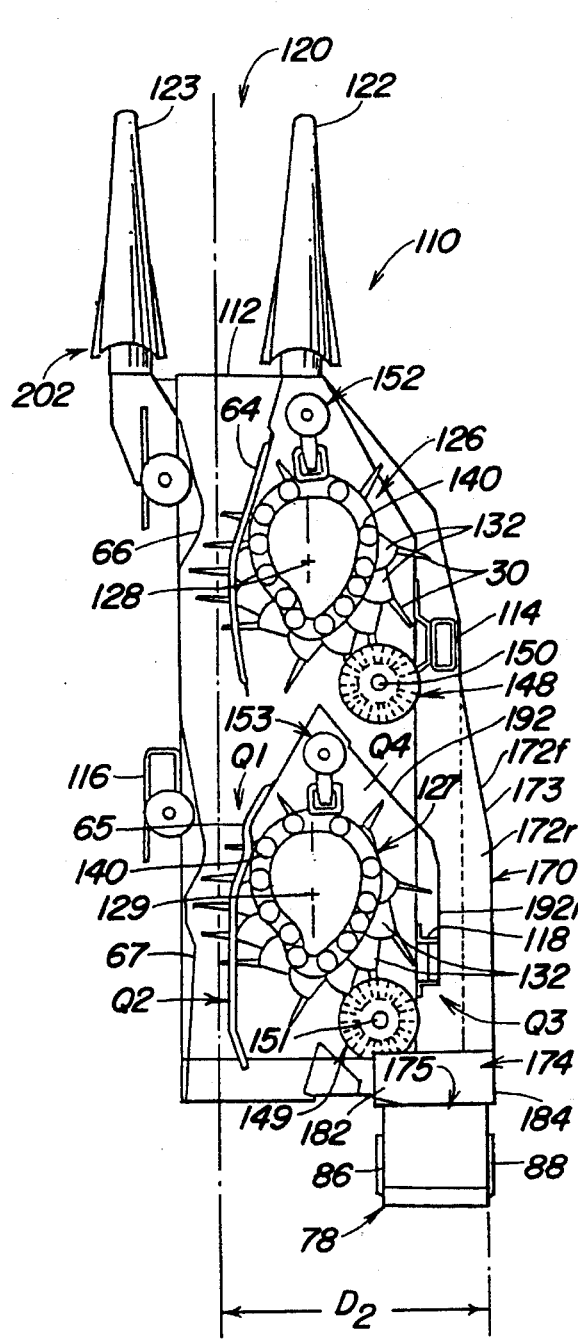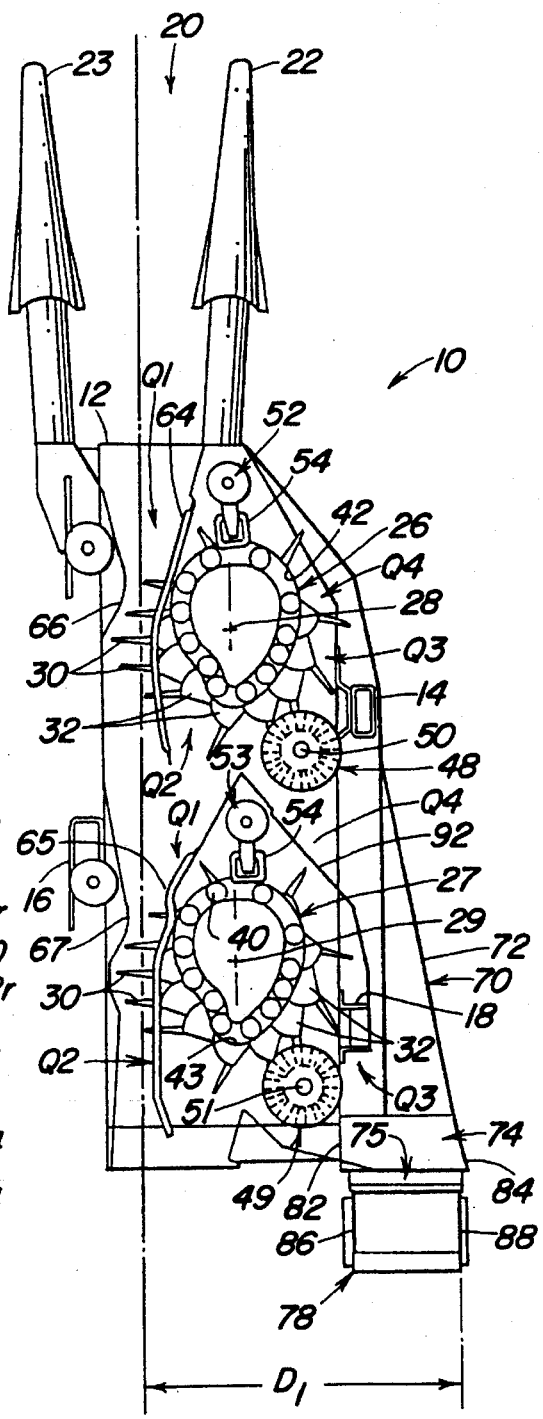
FIG. 2
FIG. 1
(PRIOR ART)

NARROW ROW COTTON PICKER AND A ROW UNIT THEREFOR

BACKGROUND OF THE INVENTION

1. Field of the Invention

The present invention relates generally to cotton harvesters, and more specifically to an improved cotton picker row unit structure and cotton harvester utilizing the improved row unit structure for harvesting cotton planted in narrowly spaced rows.

2) Related Art

In the past, cotton harvesters of the spindle type such as the John Deere model 9910 Cotton Picker included row units with front and rear picker drums located to pick cotton from the opposite sides of the row. The forward drum typically included sixteen upright bars of spindles and the rear drum had twelve bars of spindles. This configuration of drums required a relatively wide housing which limited the harvester to harvesting only two widely spaced (38 or 40 inches; 96 to 102 centimeter) rows.

Recently, narrow row cotton harvesters which are capable of harvesting four or more rows of cotton spaced as narrowly as 76 centimeters (30 inches) have been commercially available. One type of narrow row harvester, exemplified by the Case-IH model 2055 Cotton Picker, has nested units with two 12-bar drums on opposite sides of the row. A second type of narrow row harvester, exemplified by the John Deere model 9960 Cotton Picker, utilizes two 12-bar drums located one behind the other on the same side of the row. Both the Case-IH machine and the Deere machine can harvest cotton planted in a variety of row spacings from 76 to 102 centimeters (30 to 40 inches), including a number of skip row patterns.

Despite the flexibility of the machines available today, there are still a number of row spacings that picking units can not harvest. This inability to harvest some row spacings is especially true in developing countries where there is a growing interest in the mechanical harvesting of cotton but where very narrow row spacings of 60 centimeters (23.6 inches) or 30 centimeters (11.3 inches) are common. For example, in China the cotton often is planted in a 30–60 centimeter skip row pattern. The row units on present cotton harvesters, including the in-line Deere unit with two twelve-bar drums available on the Deere 9960 Cotton Picker, have widths too large to harvest such narrowly spaced rows without damage to an adjacent row of cotton plants. Lack of sufficiently narrow picking unit has limited the amount of very narrow row cotton that can be harvested mechanically.

Relatively high costs of mechanical cotton picking equipment is another problem associated with cotton harvesters. This problem is especially prevalent in developing countries where financial resources are extremely limited and a self-propelled machine dedicated only to cotton harvesting is not practical.

In-line units such as utilized on the Deere 9960 Cotton Picker include side suction door structure which receives cotton doffed rearwardly and outwardly from the spindles on the front and rear drums. The door structure diverges outwardly in the rearward direction from the forward drum area. The door structure has a cross section that continues to expand outwardly behind the rear post adjacent the rear drum. The expanded cross section facilitates entry of cotton from the rear drum into the stream of picked cotton that is moving towards the door opening to the cotton conveying ducts. However, such a configuration results in a row unit having a profile which is too wide to accommodate harvesting of very narrow row cotton. In addition, the rear doffer on the row unit commonly must handle more stalks and trash than the forward doffer, and the indirect path to the rear suction door can be prone to blockages which reduce productivity.

BRIEF DESCRIPTION OF THE INVENTION

It is therefore an object of the invention to provide an improved cotton harvester and row unit therefore which overcome most or all of the aforementioned problems.

It is another object to provide a cotton harvester row unit which is narrower than most or all of the row units presently available on the market. It is another object to provide such a row unit having improved cotton flow from the rear doffer to the suction door.

It is a further object to provide a relatively low cost cotton picker that can harvest very narrowly spaced rows of cotton.

It is yet another object of the invention to provide an improved row unit for a cotton harvester which has a narrow profile and yet which provides improved cotton flow through the door area and into the cotton conveying ducts. It is a further object to provide such a unit wherein the suction door structure is moved closer to the row centerline so that very narrowly spaced cotton can be harvested.

It is still another object to provide a relatively low cost cotton picker which utilizes the improved row unit to facilitate harvesting of very narrowly spaced rows of cotton. It is another object to provide such a cotton picker which can be mounted on the rear of a tractor to eliminate the need for a self-propelled harvested dedicated only to cotton harvesting. It is yet another object to provide such a rear-mounted harvester having an improved height sensing arrangement which advantageously utilizes the tractor hydraulic system.

In accordance with these objects, a cotton harvester row unit is provided having a door chamber cross section which remains generally constant from the rear structural post so that the suction door can be moved closer to the row centerline to narrow the overall width of the unit. The unit, which preferably has an in-line drum arrangement, is sufficiently narrow so that cotton in row spacings of less than 76 centimeters (30 inches) can be harvested. The new suction door location allows the cotton from the rear doffer to enter the door more directly. The row unit picker drums each include twelve picker bars with only fourteen to sixteen spindles per bar to shorten the height and weight of the unit and permit use of shorter stalk lifters so that unit length is also reduced.

A two-row tractor mounted picker utilizes the narrow row unit mounted on the rear of a tractor on a support system that permits lateral adjustment for picking on different row spacings. For row spacings narrower than 76 centimeters, such as 60 centimeter and 60–30 centimeter spacings, the picking units are adjusted laterally to skip one row. The shortened row unit length provides a more compact harvester with better weight distribution. A basket attachment is mounted on the tractor, and a fan and duct system is provided to convey the cotton away from the units. The unit height control system is connected to the tractor selective control valve (SCV) to provide good row unit height control.

The cost of the tractor mounted picker is a fraction of that of a self-propelled picker and has the potential to open up millions of acres of narrow row cotton to efficient, highly productive mechanical harvesting, acres that before could not be harvested mechanically because of picker size, price and configuration. These and other objects, features and advantages of the present invention will become apparent to one skilled in the art upon reading the following detailed description in view of the drawings.

BRIEF DESCRIPTION OF THE DRAWINGS

FIG. 1 is a top view of a conventional row unit typical of the prior art.

FIG. 2 is a top view of the row unit of the present invention.

DETAILED DESCRIPTION OF THE DRAWINGS

Figure 3:
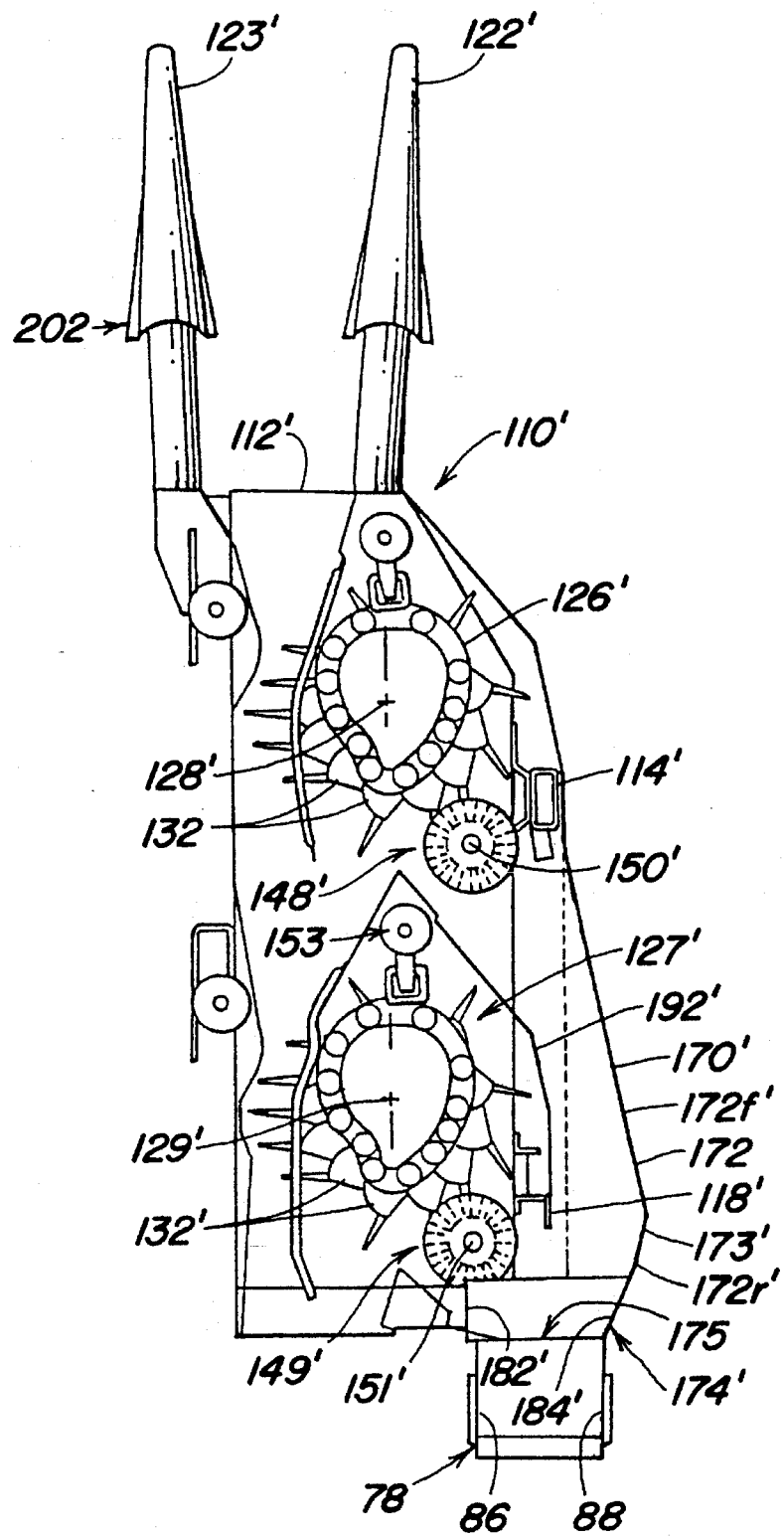
FIG. 3 is a top view of an alternate embodiment of the present invention.

The Prior Art:

Referring now to FIG. 1, therein is shown a conventional row unit 10 for a cotton picker. The row unit 10 includes a housing 12 with upright structural members such as shown at locations 14–18. A fore-and-aft extending row-receiving area 20 is defined which extends rearwardly from between right and left (as viewed in the forward direction) stalk lifters 22 and 23 through to the rear of the housing. Front and rear upright picker drums 26 and 27 with upright rotational axes 28 and 29 are supported within the housing 12 and include spindles 30 supported in rows by a plurality of upright picker bars 32. The picker bars 32 are supported for rotation about upright axes uniformly spaced about a circle which centers on the rotational axis 28 or 29 of the drum. Each picker bar 32 includes a cam arm with an upper cam roller 40 supported within the track of a cam 42 or 43 for the drum 26 or 27, respectively, which orients the bars 32 for the desired spindle position as the drum rotates about its upright axis. The spindles enter the row-receiving area in first and second drum rotation quadrants Q1 and Q2 in the counter-clockwise direction from the forwardmost extremity of the drum (as viewed in FIG. 1).

Doffer columns 48 and 49 are supported for rotation about upright axes 50 and 51 parallel to and rearwardly and outwardly of the corresponding drum axes 28 and 29 (i.e., in the third quadrant Q3 from the forwardmost extremity of the drum) for doffing cotton from the spindles. Supported adjacent the forwardmost extremities of the drums 26 and 27 (in the fourth quadrant Q4) are upright moistener columns 52 and 53, each with spindle-wiping pads 54 connected to a nozzle and distribution system located within the housing 12 for wiping the spindles 30 after cotton is doffed therefrom. The rear drum 27 is spaced a sufficient distance rearwardly of the forward drum 26 so that the path of the spindles 30 of the forward drum 26 does not intersect the rear moistener column 53.

A conventional drive mechanism (not shown) rotates the drums, spindles and doffers. As the drums 26 and 27 rotate in the counterclockwise direction as viewed in FIG. 1 through four quadrants (Q1–Q4) starting with the forwardmost portion of the drum, the path of the spindles 30 is controlled by the cam arrangement so that the spindles project into the row-receiving area through grid bars 64 and 65 (quadrants Q1 and Q2) and rotate in contact with the cotton. As shown in the drawing, the row unit 10 is an in-line unit with the drums and drum axes on one side only of the row-receiving area so that cotton is picked from one side of the plant. Pressure plates 66 and 67 urge the plants inwardly toward the spindles 30.

The cotton-wrapped spindles 30 are moved under the doffers of the doffer columns 48 and 49 in quadrant Q3, and cotton is doffed from the spindles and directed rearwardly and outwardly to suction door structure 70 to be conveyed to the harvester basket (not shown). The suction door structure 70 includes an outermost wall 72 which diverges outwardly from the forward structural member 14 in substantially planar fashion and continues to diverge outwardly past the rear structural member 18. The door structure 70 includes an aft portion 74 opening rearwardly into an upright duct 78 which leads to the basket. The aft portion 74 includes an innermost extremity 82 and an outermost extremity 84. The innermost extremity 82 is generally in alignment with the outermost extremity of the doffer column 49 and therefore is located a substantial distance outwardly from the doffer axis 51 and the row receiving area 20. The upright duct 78 includes inner and outer sidewalls 86 and 88 which are generally in alignment with the innermost and outermost extremities 82 and 84, respectively. The distance between the center of the row receiving area (or the row centerline) 20 and the outermost extremity 84, indicated at D1 in FIG. 1, is about 66 centimeters (26 inches) so that cotton planted in rows spaced less than about 76 centimeters (30 inches) cannot be harvested without substantial adjacent row cotton damage and loss.

The doffer column 48 directs cotton from the forward drum 26 rearwardly and outwardly into the door 70. An upright panel 92 extending rearwardly and outwardly of the rear moistener column 53 and structural member 18 prevents the cotton doffed from the forward drum 26 from entering the area of the rear drum 27. The rear of the panel 92 lies slightly outwardly of an upright plane defined by inner sidewall 86 of the duct 76. The doffer column axes 50 and 51 are aligned and are located generally centrally between a fore-and-aft extending plane passing through the drum axes 28 and 29 and the upright plane defined by inner sidewall 86. The rear doffer column 49 directs cotton from the rear drum 27 outwardly towards a location offset outwardly from the outermost section of the column 49 where air propels the cotton rearwardly through the opening 75 with the cotton doffed from the forward drum 26. The indirect cotton path from the doffer column 49 to the opening 75 contributes to trash build-up problems at the rear of the unit.

Description of the Invention:

Referring now to FIG. 2–5, the improved row unit structure 110 will be described in detail. The numbering for portions of the drive arrangement and individual picker bars for the improved unit 110 will remain the same as in the prior art discussion directly above since the construction is similar to that shown in FIG. 1. Therefore, with a few exceptions including the suction door and upright duct structure, the structure of the unit 110 is similar to that of the unit 10.

The row unit 110 includes a housing 112 with upright structural members at locations 114–118. A fore-and-aft extending row-receiving area 120 is defined which extends rearwardly from between right and left stalk lifters 122 and 123 through to the rear of the housing 112. Front and rear upright picker drums 126 and 127 with upright rotational axes 128 and 129 are supported within the housing 112 and include spindles 30 supported in rows by a plurality of upright picker bars 132, each of the picker bars including preferably no more than 14 spindles so that unit height is minimized. The relatively short drum also reduces unit weight and accommodates shorter stalk lifters which, as best seen in a comparison of FIGS. 1 and 2, substantially reduces the overall length of the unit 110 relative to the unit 10.

Each picker bar 132 includes a cam arm with an upper cam roller 140 supported within a cam track. The track orients the bars 132 for the desired spindle position as the drum rotates about its upright axis. Doffer columns 148 and 149 are supported for rotation about upright axes 150 and 151 for doffing cotton from the spindles 30. Supported adjacent the forwardmost extremities of the drums 126 and 127 (in the fourth quadrant Q4) are upright moistener columns 152 and 153 for wiping the spindles 30 after cotton is doffed therefrom.

The drive mechanism rotates the drums and doffers in the counterclockwise direction as viewed in FIG. 2. The drums 126 and 127 rotate through the four quadrants (Q1–Q4). The rotating cotton-wrapped spindles 30 are moved under the doffers of the doffer columns 148 and 149 in quadrant Q3, and cotton is doffed from the spindles and directed rearwardly and outwardly to suction door structure 170.

The suction door structure 170 includes an outermost wall or panel having a forward upright planar portion 172f and a rearward upright planar portion 172r. The forward portion 172f of the wall diverges outwardly from the forward structural member 114 to a juncture 173 with the portion 172r. The portion 172r extends in the fore-and-aft direction rearwardly past the rear structural member 118 and preferably is nondivergent outwardly so the distance from the portion 172r to the row centerline does not increase in the rearward direction. The door structure 170 includes an aft portion 174 opening rearwardly at 175 into the upright duct 78. The aft portion 174 includes an innermost extremity 182 which lies on or closely adjacent an upright fore-and-aft extending plane generally containing the axis 151 of the rear doffer. The fore-and-aft plane also touches the outermost portion of the cam for the rear drum 127.

The aft portion 174 also includes an outermost extremity 184 which is offset a distance D2 from the center of the row receiving area. The distance D2 is substantially less than the distance D1, and preferably is less than approximately 60 centimeters (23.6 inches). The outer sidewalls 86 and 88 of the upright duct 78 are generally in alignment with the innermost and outermost extremities 182 and 184, respectively. The wall or panel portion 172r is substantially planar and extends in the fore-and-aft direction parallel to a rear portion 192r of a divider panel 192. The front portion of the divider panel 192 extends rearwardly and outwardly around the rear drum 127 and the rear doffer column 149 to direct cotton from the forward drum 126 towards fore-and-aft extending door area between the panel portion 192r and door wall portion 172r which opens rearwardly towards the outermost portion of the opening 175. The doffer column axes 150 and 151 are aligned and are located closely adjacent a fore-and-aft extending plane passing through the drum axes 128 and 129. As can be appreciated from FIG. 2, the rearwardly directed opening at 175 is located closer to the row centerline or row receiving area 120 and more directly behind the doffer column 149 (the innermost portion of the opening 175 overlaps a substantial portion of the doffer column 149—from approximately the centerline of the doffer column outwardly as shown in FIG. 2) so that the cotton from the rear drum enters the conveying air stream more directly than that for the prior art unit 10 of FIG. 1.

In the embodiment shown in FIG. 3, a higher capacity in-line unit 110' is shown which is similar in construction to the unit described above for FIG. 2, but which includes a modified suction door structure 170' with an outer wall 172' having a forward portion 172f' which diverges outwardly from the forward structural member 114' to bend location 173' outwardly of the rear structural member 118'. From the location 173', the a rear wall portion 172r' converges in the rearward direction towards the outer wall 88 of the duct 78 and joins the outermost wall 184' of the rear portion 174'. The wall 184' is angled inwardly toward the opening 175. Longer stalk lifters 122' and 123' and larger capacity drums may be utilized on the row unit 110'. The structure of the outer wall 172' increases cotton conveying capacity of the door structure 170' but still retains a more direct cotton path from the rear doffer column 149' similar to that described above for the doffer column 149 of the FIG. 2 embodiment.

Figure 4:
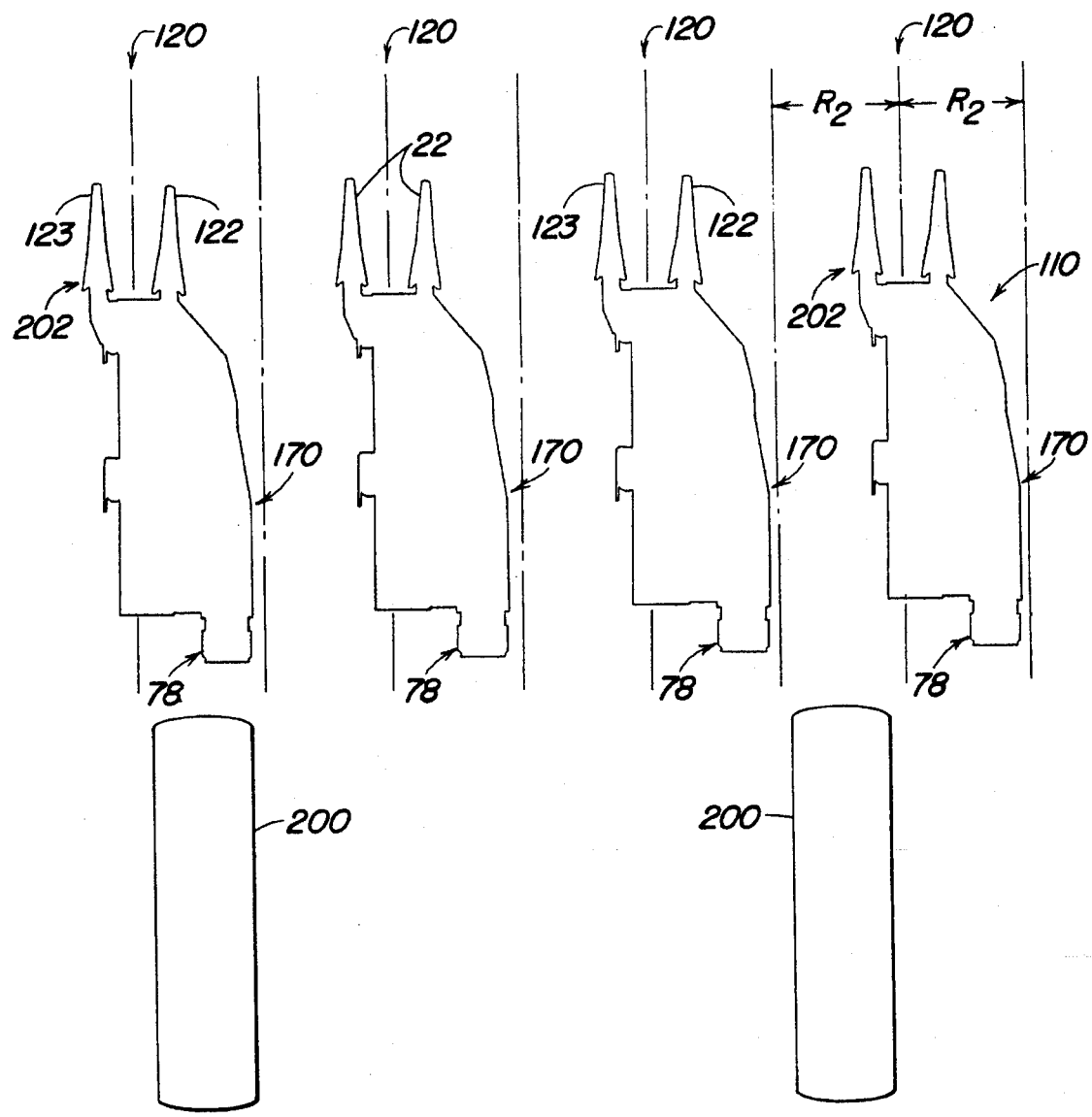
FIG. 4 is a top view of a portion of a cotton harvester with the row units of the type shown in FIG. 2 positioned for picking cotton with uniform row spacings substantially less than approximately 76 centimeters (30 inches).
Figure 5:
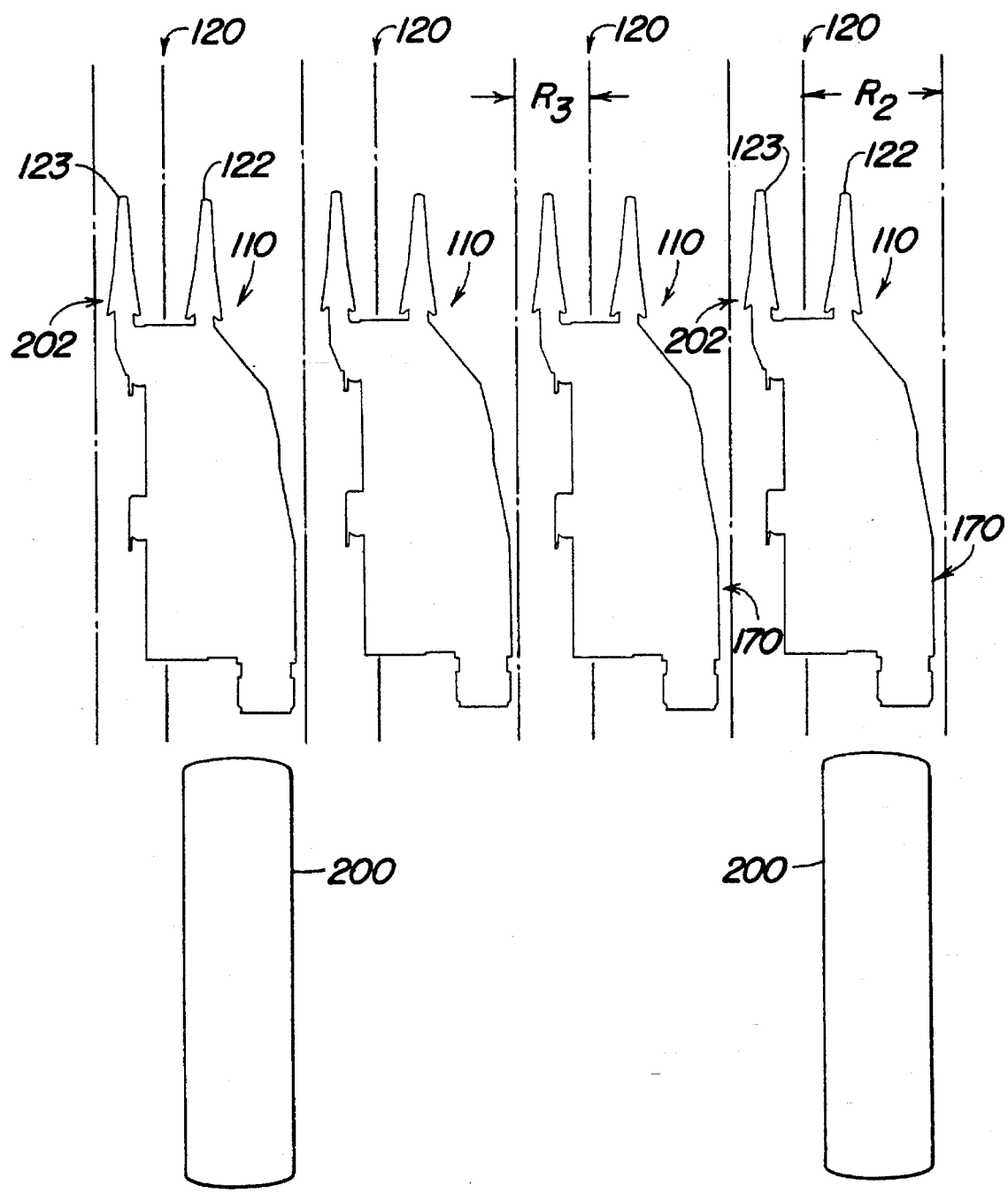
FIG. 5 is a view similar to that shown in FIG. 4 but showing the row units positioned for harvesting skip-row cotton planted with row spacings of about 30 centimeters and 60 centimeters.

Referring now to FIGS. 4 and 5, the row units 110 which are shown schematically, are mounted on a conventional self-propelled cotton harvester chassis having narrow forward drive wheels 200 which ride between very narrowly spaced rows of cotton plants. The chassis and row unit support structure are commercially available and will not be described in further detail. Reference may be had to U.S. Pat. Nos. 4,803,830 and 4,896,492 for details of a conventional chassis and support arrangement for row units. FIG. 4 shows a four-row harvester using a skip row pattern of the row units 110 for harvesting cotton planted in rows with uniform row spacings (R2) about 60 centimeters (23.6 inches). FIG. 5 shows a similar arrangement for harvesting narrow row cotton with 60–30 centimeter spacings (R2–R3). Each row unit 110 includes an inner side 202 opposite the door structure side offset from the row receiving area or row centerline less than approximately 30 centimeters so that the row unit can harvest a row of cotton spaced as little as 30 centimeters from an adjacent row without substantial damage to the adjacent row. As shown in the figures, the inner side 202 corresponds to the outside of the lifter 123.

In uniformly spaced, narrow row cotton (FIG. 4) the harvester wheels 200 are spaced to embrace five rows of cotton. The wheels 200 ride between the first and second rows (from the left side of the machine looking in the forward direction), and sixth and seventh rows, respectively. As shown, the row units 110 are uniformly spaced to harvest cotton from the first, third, fifth and seventh rows while skipping the second, fourth and sixth rows. The improved construction of the unit 110 minimizes damage to the unharvested row of cotton adjacent the side door structure 170 and assures a more blockage-free operation.

In a field planted with a narrow skip row pattern, such as a 30–60 centimeter spacing (FIG. 5), the row units 110 are uniformly spaced on the harvester to simultaneously harvest four alternate rows on one side of each pair of closest adjacent rows. The wheels 200 run between pairs of rows in skip row areas and embrace three pairs of rows. The outermost unit 110 on the lift side of the machine harvests the row of cotton outwardly adjacent the left drive wheel 200. Three remaining units 110 harvest three of the six rows embraced by the wheels 200. During the first pass in the direction shown in FIG. 5, the machine harvests the left-most (as viewed in the direction of travel) row in each of four pairs of the rows. During the second pass in the right-most rows of four pairs of rows are harvested. The in-line drum arrangement of the units 110 allows a narrow profile on the portion of the unit rearwardly of the stalk lifter 123 to reduce damage to the unharvested row in each pair of rows. Tire damage is minimized by the row unit configuration which permits the wheels 200 to always run in the skip row areas rather than on a row of cotton.

Figure 6:
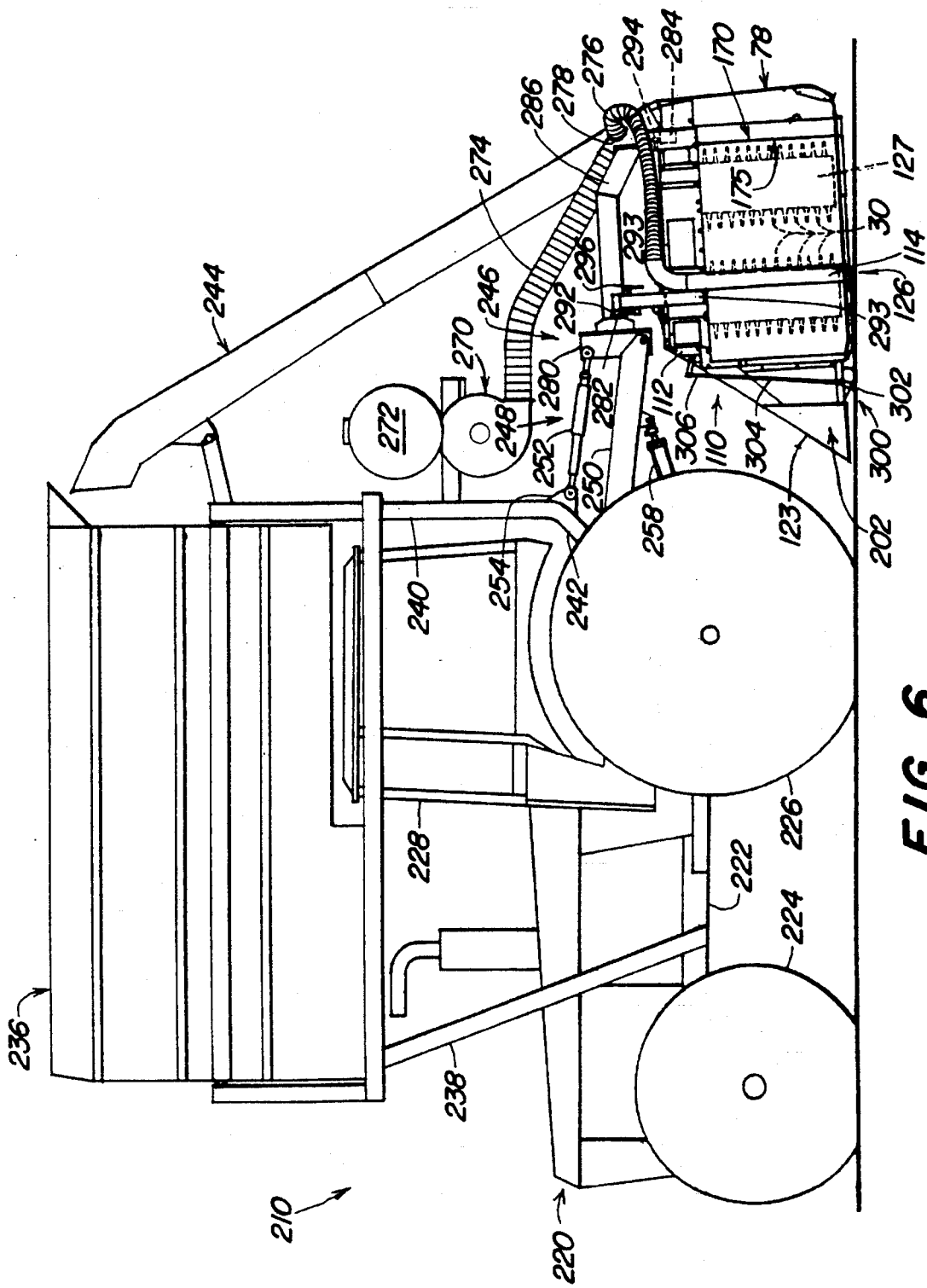
FIG. 6 is a side view of a cotton harvester with the row units of the type shown in FIG. 2 mounted at the rear of a tractor.
Figure 7:
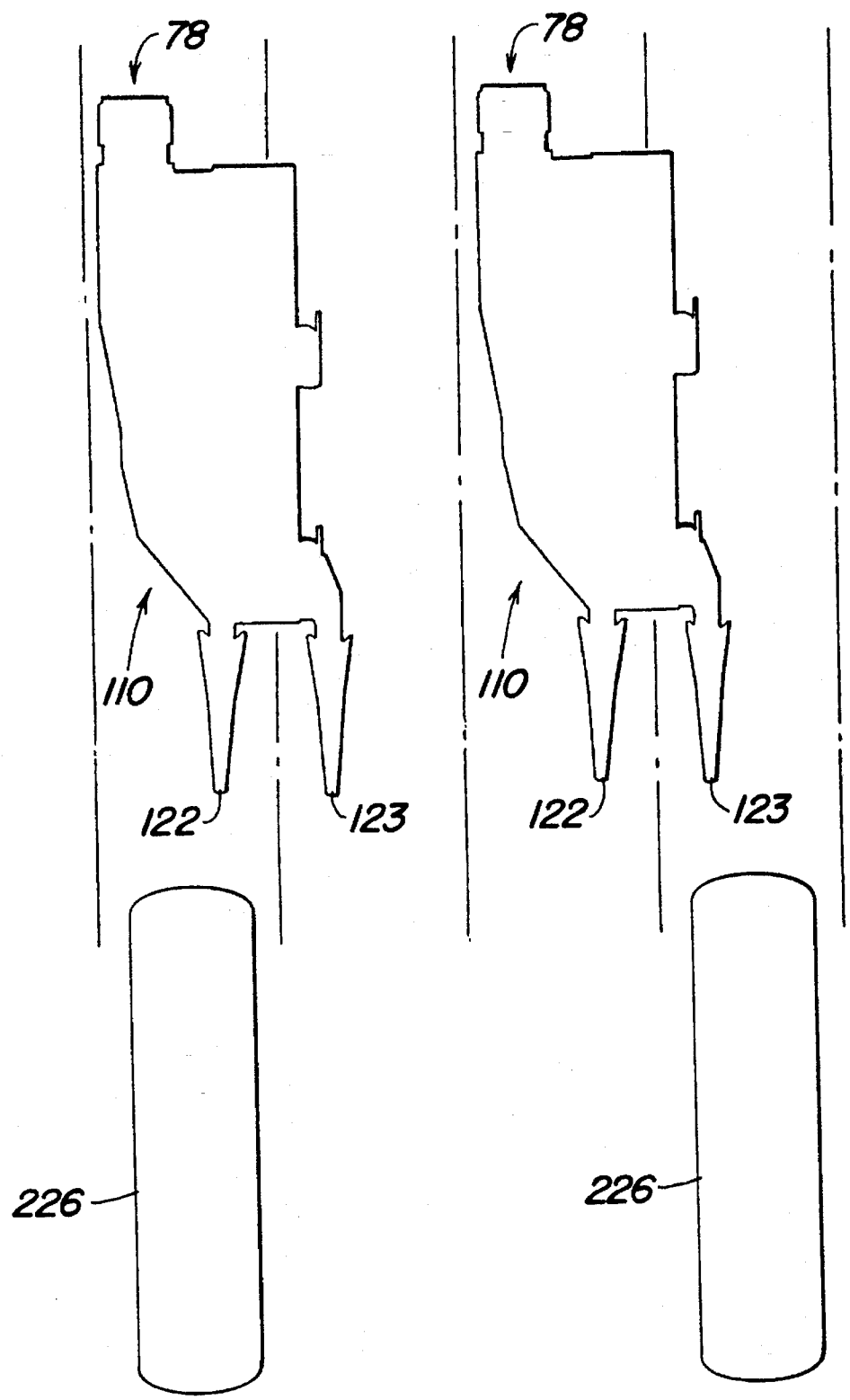
FIG. 7 is a top view of a portion of the tractor-mounted cotton harvester of FIG. 6 with the row units of the type shown in FIG. 2 positioned for picking cotton with uniform row spacings substantially less than 76 centimeters (30 inches).
Figure 8:
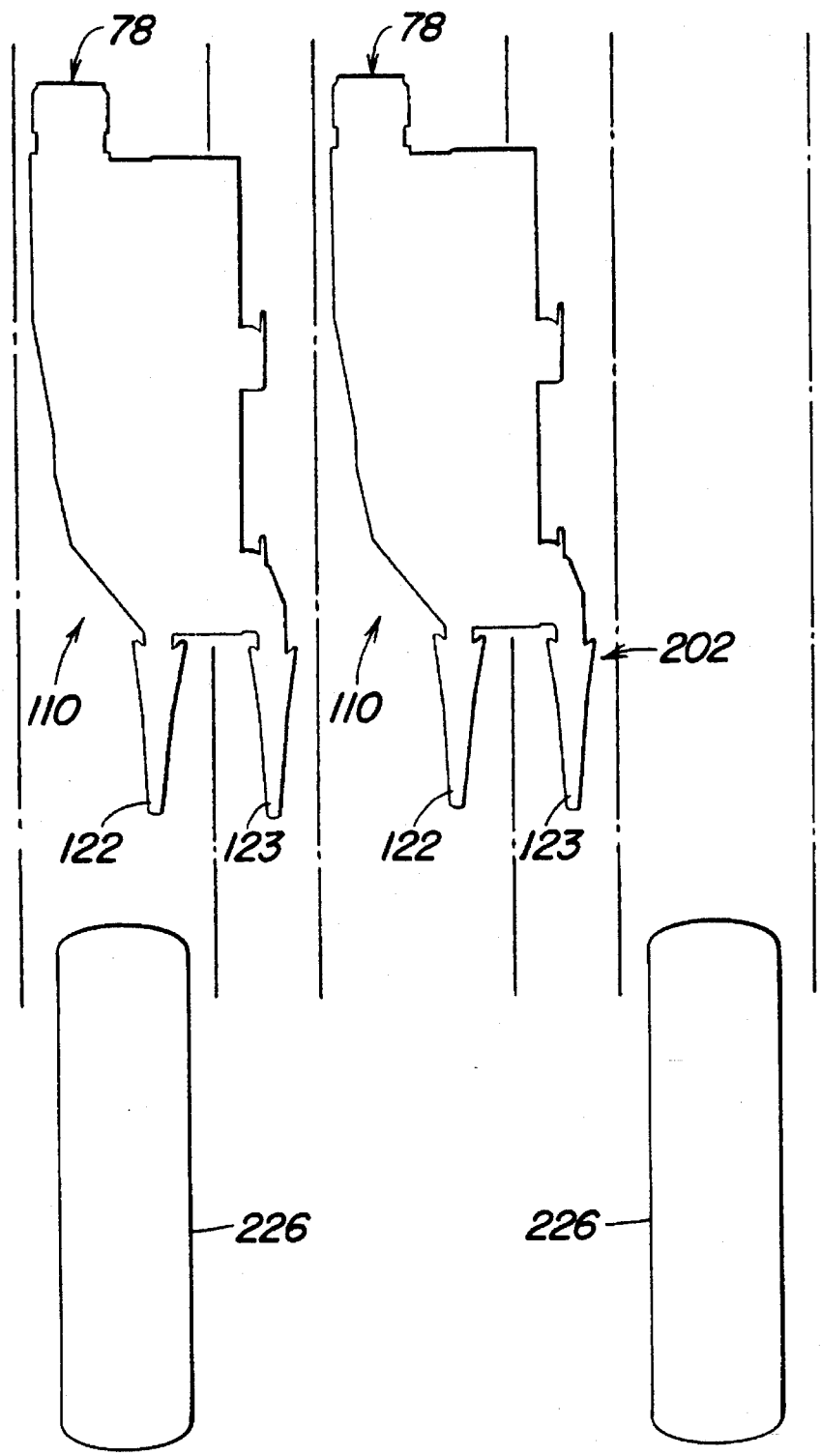
FIG. 8 is a view similar to that shown in FIG. 4 but showing the row units positioned for harvesting skip-row cotton planted with row spacings of about 30 centimeters and 60 centimeters.

The Tractor Mounted Harvester:

Referring now to FIGS. 6–8, a tractor mounted harvester 210 is shown which utilizes the narrow row units 110 to pick cotton planted in various row spacings, including the 60 centimeter uniformly spaced pattern (FIG. 7) and the 30–60 centimeter skip row pattern (FIG. 8). A tractor 220 includes a main frame 222 supported for forward movement over the ground by front wheels 224, and by rear wheels 226 spaced outwardly of a tractor cab 228. The harvester 210 includes a fore-and-aft extending basket 236 supported above the tractor 220 by a pair of transversely spaced forward basket posts 238 and a pair of rear support posts 240 connected at their lowermost ends to the tractor frame 222. The support posts 240 include lower angled support members 242 connected to the tractor axles. Upwardly and forwardly extending telescoping ducts 244 are connected to the duct structure 78 and include upper ends opening forwardly into the upper aft portion of the basket 236.

Figure 9:
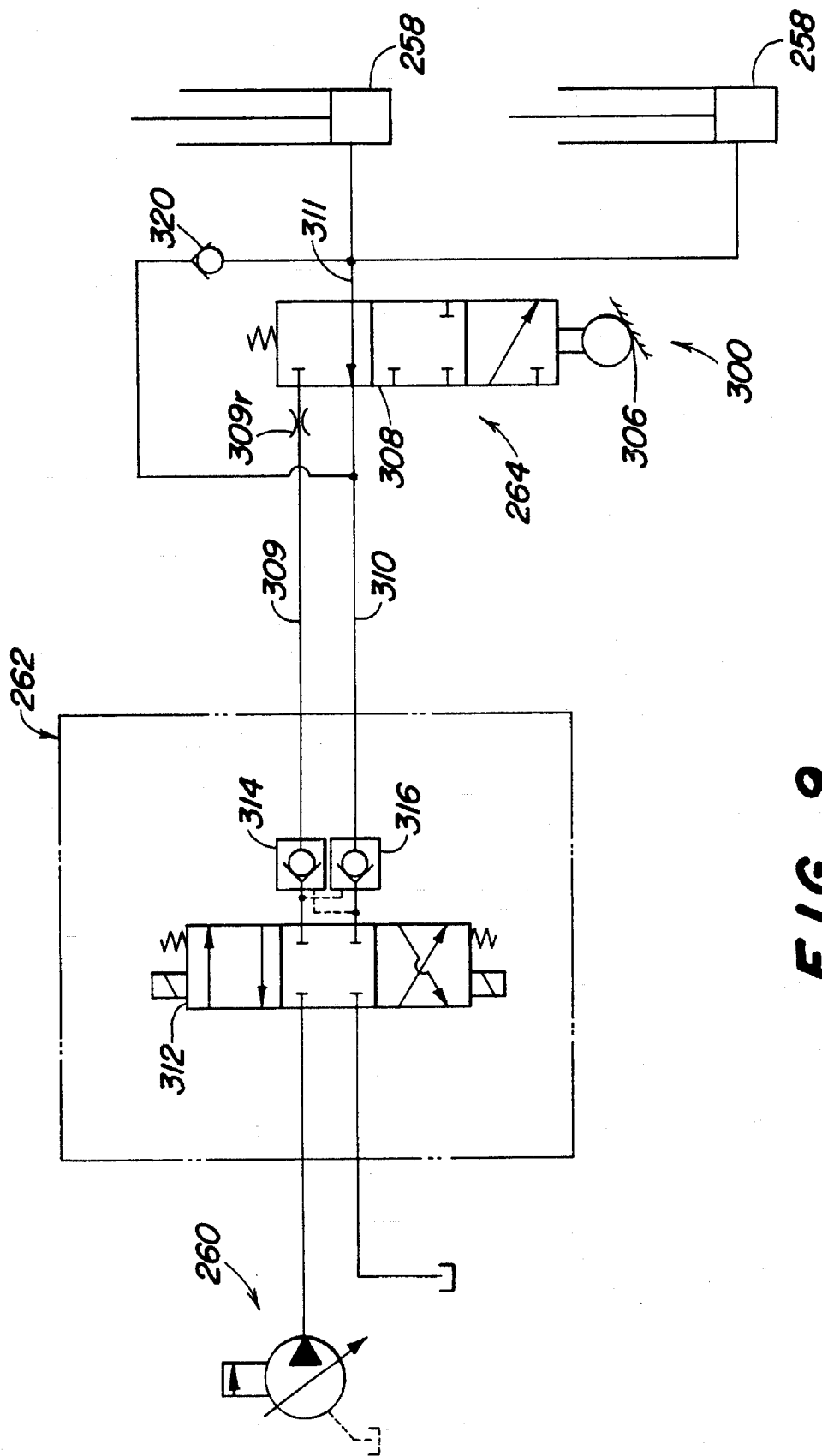
FIG. 9 is a schematic of a hydraulic lift circuit for the height sensing arrangement on the harvester of FIG. 6.

A row unit support frame 246 is connected to the tractor by a lift linkage arrangement 248. The linkage arrangement 248 includes a pair of lower arms 250 having forward ends pivotally connected to the lower end of the members 242. A pair of adjustable length upper links 252 have forward ends pivotally connected the rear posts 240 at bend locations 254. The aft ends of the arms 250 and the links 252 are pivotally connected to the support frame 246 to form four-bar linkage structure which controls the attitude of the support frame 246. The vertical position of the lift frame 246 is controlled by a pair of lift cylinders 258 connected between the lower ends of the posts 240 and central locations on the lower arms 250. The cylinders 258 are connected to a source of hydraulic fluid under pressure 260 (FIG. 9) on the tractor 220 through a tractor selective control valve (SCV) assembly 262 and a height control valve assembly 264, which will be described in detail below. A hydraulically driven fan 270 for providing air to the cotton conveying system and a liquid tank 272 for supplying liquid to the moistener columns 152 and 153 are supported from the rear posts 240 behind the tractor cab 228. Air conduits 274 and 276 connect the output of the fan 270 with duct nozzles 278 and with the structural members 114 which open rearwardly at the bottom of the door structure 170 and provide a lower jet of air to help propel cotton rearwardly toward the opening 175.

The unit support frame 246 includes forward mounting bracket structure 280 pivotally connected to the aft ends of the arms 250 and the links 252. Transversely extending rail structure 282 is fixed to the bracket structure 280. Second transversely extending rail structure 284 is supported rearwardly of and below the level of the rail structure 282 by upper support beams 286 which extend rearwardly from the structure 282. Transversely spaced forward rollers 292 are connected by brackets 293 to each row unit housing 112 and support the forward portion of the unit 110 from the forward rail structure 282. Rear rollers 294 connected to the aft end of the housings 112 are supported on the aft rail structure 284. The units 110 are transversely adjustable on the rail structures to accommodate different row spacings and patterns, including those shown in FIGS. 7 and 8. A spring loaded pin 296 aligns with one of a series of apertures in the forward rail structure 282 to secure the row unit 110 in the desired position.

To adjust row unit position, the pin 296 is pulled and the row unit 110 is rolled transversely to the desired location on the rail structures 282 and 284. The pin 296 is then released to enter another one of the series of apertures to retain the unit in the adjusted position. Further details of the row unit support structure may be had, for example, by reference to commonly assigned U.S. Pat. No. 4,896,492 entitled "ROW UNIT SUPPORT MECHANISM FOR TRANSVERSE MOVEMENT". Further details of the support post structure may be had, for example, by reference to commonly assigned U.S. Pat. No. 4,348,856 entitled "TRACTOR MOUNTED COTTON HARVESTER".

As shown in FIG. 7, tractor wheel tread is adjusted so that three narrowly spaced rows are embraced by the wheels 226. Narrow tires are provided so that the wheels do not damage adjacent rows of cotton. The row units 110 are adjusted to pick the two rows of cotton inwardly adjacent the wheels 226 so that alternate rows are picked during each pass of the machine. In the narrow skip row configuration of FIG. 8, the wheels 226 embrace two narrowly spaced rows, and the right row of cotton in each of the pairs of rows is picked by the units 110. The wheels 226 are spaced to run in the wide area (60 centimeters) between pairs of rows.

The row unit 110 (FIG. 6) includes a height control linkage 300 connected to the height control valve assembly 264 (FIG. 9) for extending and retracting the cylinders 258. The linkage 300 includes a ground sensing shoe pivotally connected to the bottom of the unit 110. A rod 304 connects the shoe 302 with a valve operator 306 which in turn is connected to a valve 308 of the assembly 264 so that the cylinders 258 will be extended when the unit 110 is below a preselected lower limit and will be retracted when the unit is above a preselected upper limit.

The valve 308 has input ports connected via lines 309 and 310 to the SCV assembly 262 and output ports connected to the base ends of the cylinders 258. The assembly 262 includes an SCV valve 312, which preferably is the rockshaft control valve on the tractor 210. Pilot operated check valves 314 and 316 are connected between the output ports of the valve 312 and the input ports of the valve 308. Assuming the units 110 are fully raised to the transport position and the valve 312 is in the position shown in FIG. 9, to lower the units 110 and provide automatic height control, the operator first moves the valve 312 to pressurize the line 309 and return the line 310 to the reservoir. The cylinders 258 retract to lower the units until the linkage 306 moves the valve 308 to the central closed position as the shoe 302 contacts the ground and pivots upwardly. The valve 308 remains closed until the row units move beyond the limits of a preselected range of acceptable heights. If the row units move too high off the ground, the shoe 302 pivots downwardly and moves the valve to the position shown in FIG. 9 so the cylinders 258 retract and lower the units. If the row units move to close to the ground, the valve will move upwardly to connect the pressurized line 309 to the base ends of the cylinders 258 to raise the units. To raise the units 110 to the uppermost transport position, the operator simply moves the valve 312 to the uppermost position to pressurize line 310. A check valve 320 is connected between the line 310 and the base ends of the cylinders 258 to provide a path between the pressurized line 310 and the cylinders regardless of the position of the valve 308 when the valve 312 is moved to the raise position.

Having described the preferred embodiment, it will become apparent that various modifications can be made without departing from the scope of the invention as defined in the accompanying claims.

We claim:

1. In a cotton harvester for harvesting cotton planted in rows, a row unit comprising:

a fore-and-aft extending row unit housing defining a row receiving area;

a cotton conveying duct located at the aft end of the row unit;

a first harvesting drum supported by the housing for rotation about an upright axis beside the row receiving area, the drum including a plurality of spindles for picking cotton from a row of cotton plants in the row receiving area;

a second harvesting drum supported by the housing rearwardly of and on the same side of the row receiving area as the first drum;

door structure extending rearwardly from a forward location outwardly adjacent the forward drum toward the aft end of the row unit, the door structure including a rearwardly directed area opening into the cotton conveying duct;

front and rear doffer columns located near the rear of the harvesting drums for removing picked cotton from the spindles and directing the cotton outwardly to the door structure, wherein the rearwardly directed opening has a substantial portion aligned in the fore-and-aft direction with the rear doffer column to thereby provide a direct path rearwardly from the rearward doffer column to the duct; and wherein the door structure includes an outermost upright wall having a rearward portion which is nondivergent outwardly relative to the row receiving area from a location adjacent the rear drum to the aft end of the unit, the upright wall offset outwardly from the row receiving area a distance substantially less than 66 centimeters (26 inches).

2. The invention as set forth in claim 1 wherein the door structure opens rearwardly at a location rearwardly adjacent the doffer column for the rear drum to thereby provide a direct path from the doffer column to the opening.

3. In a cotton harvester for harvesting cotton planted in rows, a row unit comprising:

a fore-and-aft extending row unit housing defining a row receiving area;

a cotton conveying duct located at the aft end of the row unit;

a first harvesting drum supported by the housing for rotation about an upright axis beside the row receiving area, the drum including a plurality of spindles for picking cotton from a row of cotton plants in the row receiving area;

a second harvesting drum supported rearwardly of and on the same side of the row receiving area as the first drum;

door structure extending rearwardly from a forward location outwardly adjacent the forward drum toward the aft end of the row unit, the door structure including a rearwardly directed opening which opens into the cotton conveying duct;

forward and rearward doffer columns located near the rear of the respective first and second harvesting drums for removing picked cotton from the spindles and directing the cotton to the door structure; and wherein the rearward doffer column is located forwardly of and is aligned in the fore-and-aft direction with a portion of the opening to provide a direct path rearwardly from the rearward doffer column into the duct.

4. The invention as set forth in claim 3 wherein the door structure includes an outermost upright wall having a rearward portion which is offset outwardly from the row receiving area a distance substantially less than 66 centimeters (26 inches) so that cotton planted in row spacings of 60 centimeters or less are accommodated by the row unit.

5. A cotton harvester comprising:

a tractor having transversely spaced wheels, a fore-and-aft extending frame supported by the wheels for forward movement over a field having cotton planted in parallel rows spaced approximately 60 centimeters or less, and a source of hydraulic fluid under pressure;

a basket supported from the tractor frame;

a duct extending upwardly behind the tractor and opening into the basket;

a fore-and-aft extending row unit having a crop receiving area and upright picker drum structure with spindles located on one side only of the crop receiving area, doffer column structure supported adjacent the drum structure for doffing cotton from the spindles and directing the cotton rearwardly, and door structure opening rearwardly toward the duct for receiving doffed cotton and directing the cotton into the duct;

wherein the door structure is located on the side of the drum structure opposite the row receiving area and has an outermost wall located no more than approximately 60 centimeters from the row receiving area, and wherein the door structure extends rearwardly and is nondivergent outwardly in the rearward direction from a location adjacent the drum structure, the doffer column structure including a rear upright doffer defining a substantially fore-and-aft extending cotton conveying path from the drum structure directly to the duct; and a support located rearwardly of the tractor and supporting the row unit rearwardly of the wheels.

6. A cotton harvester comprising:

a tractor having transversely spaced wheels, a fore-and-aft extending frame supported by the wheels for forward movement over a field having cotton planted in parallel rows spaced approximately 60 centimeters or less, and a source of hydraulic fluid under pressure;

a basket supported from the tractor frame;

a duct extending upwardly behind the tractor and opening into the basket;

a fore-and-aft extending row unit having a crop receiving area and upright picker drum structure with spindles located on one side only of the crop receiving area, doffer column structure supported adjacent the drum structure for doffing cotton from the spindles and directing the cotton in substantially a rearward direction, and door structure defining a rearward opening for receiving doffed cotton and directing the cotton into the duct;

wherein the door structure is located on the side of the drum structure opposite the row receiving area and has an outermost wall located no more than approximately 60 centimeters from the row receiving area, and wherein the door structure extends rearwardly from a location adjacent the drum structure;

a support located rearwardly of the tractor and supporting the row unit rearwardly of the wheels;

wherein the row unit includes an inner side opposite the door structure side of the row unit, wherein the inner side is offset from the row receiving area less than approximately 30 centimeters so that the row unit can harvest a row of cotton spaced no more than 30 centimeters from an adjacent row without substantial damage to the adjacent row, and wherein a substantial portion of the doffer column structure is aligned in the fore-and-aft direction with the opening so that a direct cotton conveying path rearwardly from the doffer column structure through the opening and into the duct is defined.

7. The invention as set forth in claim 5 wherein the door structure opens rearwardly into the duct directly behind the doffer structure so that a direct path is provided from the doffer structure to the duct for relatively unimpeded cotton flow from the doffer structure into the duct.

8. The invention as set forth in claim 5 wherein the tractor includes a rockshaft selective control valve, and wherein the harvester includes a height control connected to the selective control valve.

9. The invention as set forth in claim 5 wherein the harvester includes first and second row units transversely spaced at the aft end of the tractor frame and spaced to harvest a pair of rows of cotton spaced a distance of no more than approximately 60 centimeters from each other.

10. The invention as set forth in claim 10 wherein the tractor includes wheels spaced to embrace at least three narrowly spaced rows of cotton, and wherein the row units are spaced to harvest two of the rows of cotton.

11. The invention as set forth in claim 6 wherein the tractor includes wheels spaced to embrace two pairs of rows with a spacing between pairs of approximately 60 centimeters and with the row spacings in each pair being approximately 30 centimeters apart.

12. The invention as set forth in claim 5 wherein the door structure is nondivergent outwardly relative to the row receiving area from a location adjacent the drum structure to the aft end of the unit.

13. The invention as set forth in claim 5 wherein the drum structure includes a forward drum and a rearward drum, and wherein the outermost wall of the door structure extends in the fore-and-aft direction from a location adjacent the rearward drum.

14. The invention as set forth in claim 13 wherein the doffer column structure includes a rear doffer column rearwardly adjacent the rearward drum and wherein the door structure opens onto a portion of the rear doffer column so that a direct path to the duct is provided for cotton doffed by the rear doffer.

15. The invention as set forth in claim 13 including panel structure adjacent the rearward drum extending inwardly of and parallel to the outermost wall for diverting cotton doffed from the forward drum outwardly around the rearward drum.

16. A cotton harvester for harvesting cotton planted in rows, the harvester comprising a plurality of row units, each unit comprising:

a fore-and-aft extending row unit housing defining a row receiving area;

a cotton conveying duct located at the aft end of the row unit;

a first harvesting drum supported by the housing for rotation about an upright axis beside the row receiving area, the drum including a plurality of spindles for picking cotton from a row of cotton plants in the row receiving area;

a second harvesting drum supported by the housing rearwardly of and on the same side of the row receiving area as the first drum;

door structure extending rearwardly from a forward location outwardly adjacent the forward drum toward the aft end of the row unit, the door structure including a rearwardly directed area opening into the cotton conveying duct;

forward and rearward doffer columns located near the rear of the harvesting drums for removing picked cotton from the spindles and directing the cotton outwardly to the door structure;

wherein the door structure includes an outermost upright wall having a rearward portion which is nondivergent outwardly relative to the row receiving area from a location adjacent the rear drum to the aft end of the unit, the upright wall offset outwardly from the row receiving area a distance substantially less than 66 centimeters (26 inches) to facilitate placement of the row units with the spacing between row receiving areas on adjacent units substantially less than 76 centimeters; and wherein the rearward doffer column is located forwardly of and is aligned in the fore-and-aft direction with a portion of the opening to provide a direct path rearwardly from the rearward doffer column into the duct.

17. The invention as set forth in claim 16 wherein the row units include an innermost portion opposite the outermost upright wall, the innermost portion spaced less than approximately 30 centimeters from the row receiving area to facilitate harvesting of rows of cotton spaced as narrowly as 30 centimeters.

18. The invention as set forth in claim 17 wherein the harvester includes wheels spaced to embrace at least three rows of cotton spaced between approximately 30 to 60 centimeters, and units spaced to simultaneously harvest two of the rows embraced between the wheels.

\* \* \* \* \*